Patented Feb. 27, 1951

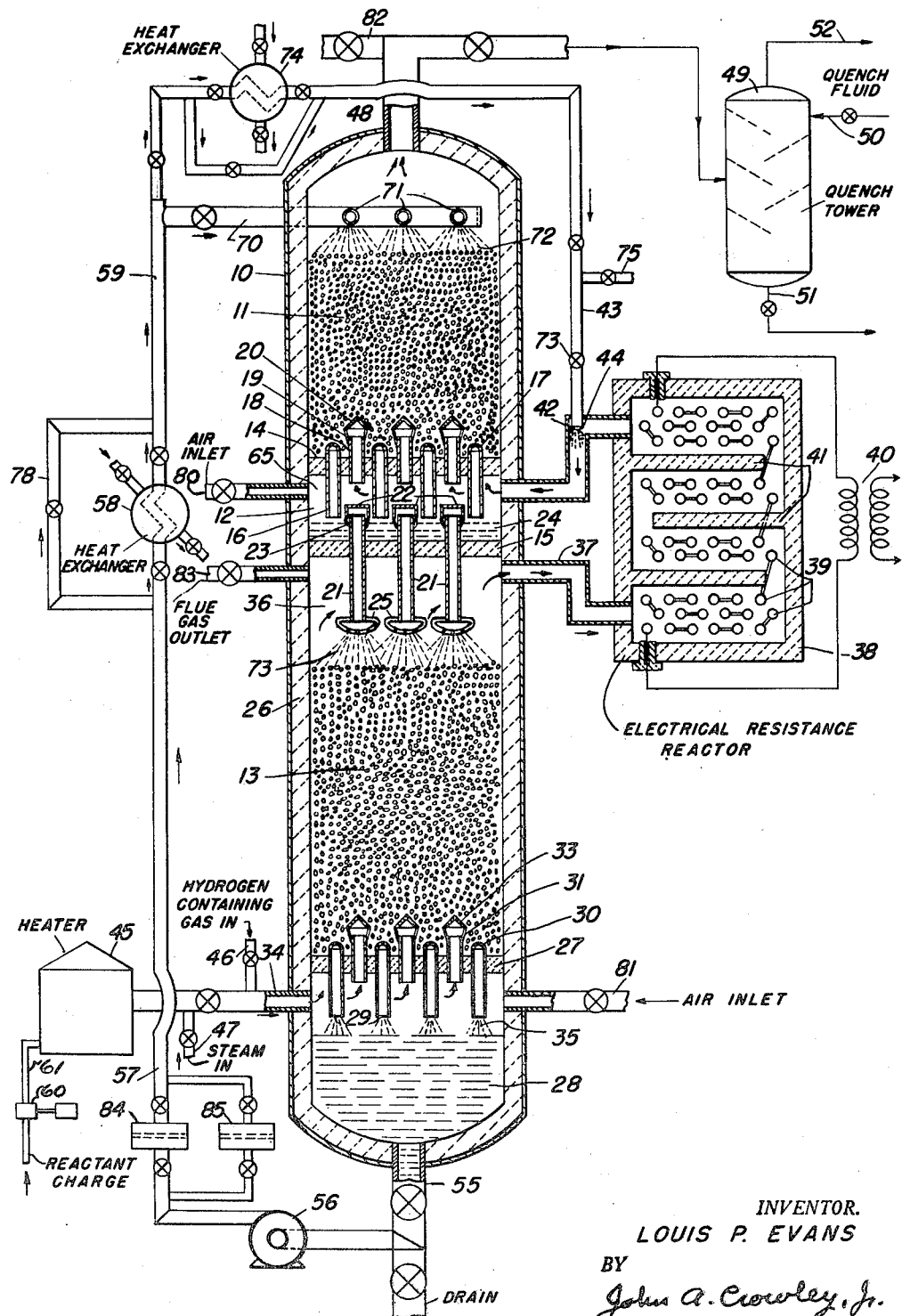

2,543,743

UNITED STATES PATENT OFFICE 2,543,743

METHOD AND APPARATUS FOR HIGH-TEMPERATURE HYDROCARBON CONVERSIONS

Louis P. Evans, Woodbury, Mass., assignor to Socony-Vacuum Oil Company, Incorporated, a corporation of New York Application August 22, 1947, Serial No. 770,049

18 Claims. (Cl. 260—679)

This invention pertains to process for conducting high temperature thermal conversions of gaseous material. This invention is particularly concerned with conversions wherein the reaction product is highly unstable under the elevated temperatures involved and requires quick cooling to prevent decomposition or polymerization thereof. Exemplary of such processes is the high temperature conversion of methane, propane and other light hydrocarbons to acetylene at temperatures of the order of 2300° F. Another process is the pyrolytic dehydrogenation of unsaturated $C_2$ and $C_3$ hydrocarbons to di-olefins at temperatures of the order of 1400° F. to 1500° F. Another process is the pyrolytic cracking conversion of saturated light hydrocarbons such as ethane and butane to ethylene and hydrogen at temperatures of the order of 1300° F. to 1750° F.

Several practical difficulties arise in attempting to conduct such processes as enumerated hereinabove. The temperatures required for the reaction are very high, the amount of heat absorbed by the endothermic reaction is very great and the reaction products must be quickly cooled after formation in order to prevent decomposition. It is, therefore, necessary that the rate of heat input be very rapid and this in turn requires the largest possible excess of temperature in the source of heat above the temperature of formation and a large total of available heat relative to the volume of the gas receiving it. The passage of reactant gases through externally heated tubes is believed to be uneconomical commercially because of the low heat transfer rates and impractical commercially at temperatures above about 1500° F. because of the difficulty of providing metal tubes which will withstand the very high temperature levels involved. The use of refractory checker work furnaces heated by carbonaceous fuels is undesirable because such a process must be conducted intermittently or batch-wise or, if conducted continuously, the reaction products are diluted with large volumes of combustion gases causing trouble in the cooling and fractionation equipment. A properly designed electrically heated furnace is particularly well adapted as a reaction chamber for such high temperature reactions but such a reactor has not been heretofore practical because of the excessive cost involved in heating the reactant gas to the reaction temperature. Also in such a process a very difficult problem arises as to how to quench the reaction products quickly and economically while avoiding coking difficulties in long product transfer lines.

A major object of this invention is the provision of an improved practical process and apparatus for conducting gaseous conversions of the type requiring very high temperatures and rapid quenching of the reaction products.

Another object of this invention is the provision of a practical and economical continuous process for conversion of hydrocarbons in electrically heated zones.

A specific object of this invention is the provision of a practical and economical continuous process for the production of acetylene from hydrocarbon gases at high temperatures.

Another specific object is the provision of a continuous process for the pyrolytic conversion of gaseous hydrocarbons to ethylene.

Still another object is the provision of a continuous pyrolytic process for the formation of butadiene from hydrocarbon gases.

These and other objects of this invention will become apparent from the following discussion thereof.

In a preferred form of this invention gaseous hydrocarbon reactant feed is passed through a refractory packed preheating zone countercurrently to hot molten heat exchange metal which serves to preheat the reactant to a temperature approaching but preferably below the desired reaction temperature. The preheated hydrocarbon reactant is then passed through an electrically heated reaction zone wherein it is converted to an acetylene containing product. The gaseous reactant product is then partially quenched on leaving the reaction zone by injection thereinto of a spray of cooler molten metal. The partially quenched reaction product is then passed through a refractory packed principal quench zone countercurrently to cooler molten metal which becomes heated while removing heat from the quenched products. The cooled products are then withdrawn from the upper section of the quenching zone and passed to a suitable product recovery system. The heated molten metal from the quench zone is passed to the preheating zone as the supply thereto and the cooled molten metal from the preheating zone is returned to the quench zone. The desired temperatures may be constantly maintained throughout the system by control of the inlet temperature of the reactant feed to the preheating zone, by control of the rate of molten metal flow and by subjecting it to heat exchange before its return to the quench zone and by control of the rate and temperature of quench fluid flow. In the preferred form of the invention the quench fluid injected into the reactant products at the zone of initial quench is the same molten metal fluid passed through the main quench zone and the preheating zone and may pass from the zone of initial quench on through the preheating zone. In such a system the initial partial quench of reaction products permits accurate control of the temperature of reactant feed preheat. It should be understood that the words "gas" and "gaseous" as employed hereinabove and hereinafter in describing and claiming this invention are employed in a broad sense as meaning material in the gaseous phase under the particular conditions of temperature and pressure involved at the point under discussion regardless of the normal phase of that material under ordinary atmospheric conditions.

This invention may be most readily understood by reference to the single drawing attached hereto which is an elevational view, partially in section, of the preferred form of the invention. This drawing is highly diagrammatic in form.

Turning now to the drawing, we find a vertical vessel 10 which is divided into an upper quench chamber 11, an intermediate seal chamber 12 and a preheating chamber 13 by means of horizontal partitions 14 and 15. The chambers 11 and 13 are packed with an inert refractory material in granular form which serves to insure uniform distribution and contacting between the molten metal and the gaseous reactants. Tubes 16 extend downwardly through partition 14 and terminate within chamber 12. Caps 17 containing perforations therein which will permit passage of molten metal but prevent passage of inert packing material are provided on the upper ends of tubes 16. Tubes 18 extend from the upper portion of chamber 12 through partition 14 for flow of gas into chamber 11. Conical hoods 20 supported by rods 19 or other suitable means are located over the upper ends of tubes 18 to prevent entry of the packing material into the tubes. Tubes 21 extend from a location in chamber 12 preferably above the lower ends of tubes 16 through partition 15 to a level therebelow in chamber 13. Inverted caps 22 are supported by rods 23 or other suitable means over the upper ends of tubes 21. The caps 22 are of larger diameter than tubes 21 and the lower edges of the caps extend substantially below the upper ends of tubes 21. In this manner a seal pool of molten metal 24 is provided in chamber 12 against the flow of gas from chamber 13 up through the tubes 21. Spray nozzles or perforated heads 25 are provided on the lower ends of tubes 21 to spray the molten metal from chamber 12 uniformly onto the bed of packing material in chamber 13. The tubes 18, 16 and 21 are uniformly distributed with respect to the vessel horizontal cross-sectional area. The vessel 10 is suitably lined with a refractory material 26 capable of withstanding temperatures of the order of 1500° F.—3000° F. The partitions 14 and 15 and the tubes 16, 18 and 21 are also constructed of refractory material. Exemplary of such refractories are fused alumina, zirconia, chromate or other types of highly refractory materials.

Granular refractory packing material is also provided as a bed in chamber 13. A horizontal partition 27 is positioned across the lower section of vessel 10 to define the bottom of chamber 13 and to provide in the bottom of vessel 10 a molten metal sump 28 and a gas inlet distributing space 35. Tubes 29 extend downwardly through the partition 27 for passage of molten metal to the sump chamber. Caps 30 similar to caps 17 are provided on the upper ends of tubes 29. Uniformly distributed gas distributor tubes 31 also pass through the partition 27 for passage of gas into the bed of refractory packing in chamber 13. Conical baffles 33 are provided above the upper ends of tubes 31 to prevent escape of the granular packing material. A reactant feed inlet 34 connects into the gas space 35 below partition 27.

The preheated reactant gas may be passed from the gas space 36 provided in the upper section of chamber 13 around tubes 21 through a refractory lined conduit 37 to an electrical resistance furnace 38. A number of resistance bars or tubes 39 constructed of graphite carbon, tungsten or other suitable material extend across the furnace 38 in a direction perpendicular to the drawing. These bars may be connected in parallel or in series as shown to a source of electric supply through a transformer 40. A system of refractory baffles 41 are provided in the furnace 38 to form a tortuous gas passageway. Further baffles or even lumps of refractory material may be provided in the furnace 38 to increase the heating surface area which will be contacted by the gas flowing through the furnace. The reaction products are withdrawn from furnace 38 through refractory lined conduit 42 wherein they are partially quenched by a suitable molten metal introduced through pipe 43 and spray device 44. The gaseous products are directed by conduit 42 into the gas distributing space 65 provided by partition 14, and tubes 16.

When the resistance members 39 consist of tubes, the furnace construction may be suitably modified to permit passage of all or a part of the reactant gas through rather than around the resistance members 39.

As an example of the operation of the apparatus, its application to a process for conversion of hydrocarbon gases such as methane, ethane, ethylene, propane or butane, for example, to acetylene may be studied. If desired, the charging stock may also consist of higher boiling hydrocarbons such as naphthas or gas oil, etc. A dilution gas such as hydrogen may be charged simultaneously with the hydrocarbon feed. In this process the reaction temperature required may range from about 1800° F. to 3000° F. depending on the charge. When the charge is methane, reaction temperatures of the order of 2300° F. and upwards are desirable. The pressure should be as low as possible, preferably atmospheric or below. The hydrocarbon feed enters heater 45 from pump or compressor 60 and conduit 61 and is heated to a suitable inlet temperature, for example 500° F. and is then passed through conduit 34 alone or in admixture with hydrogen containing gas introduced at 46 into the distributing space 35 in vessel 10. The gaseous reactants pass upwardly through the column of inert solid particles in chamber 13 and become preheated to a temperature below but approaching the desired reaction temperature. For example, in the case of the conversion of methane to acetylene when the furnace 38 is maintained at temperatures above about 2300° F., the reactant feed may be preheated to about 1800° F.—2100° F. or somewhat higher in chamber 13. The preheated gas at 2000° F. for example, then passes via conduit 37 into the furnace 38 wherein it is converted to an acetylene containing gaseous product which is withdrawn from the reaction zone through conduit 42. The products may be subjected to a partial quench by means of a suitable molten metal quench fluid introduced at 44. The metal may be sprayed into the reaction product stream as shown in which case duct 42 serves as a preliminary quench zone. Alternatively a baffled or packed tower of conventional construction adapted for countercurrent contacting of liquids and gases may be inserted in duct 42 between reactor 38 and the quench zone 11. The purpose of the partial quench in conduit 42 is to cool the gaseous products to a temperature approximating the temperature of the preheated reactant feed entering furnace 38. In this manner the temperature of the molten metal passing from chamber 11 to chamber 13 may be controlled at the desired maximum level of the reactant feed preheat. This provision is of considerable importance because of the necessity for accurately controlling the amount of time at which the reactant gas exists at the desired reaction temperature. Too long a reactant residence time at the reaction temperature results in decomposition and polymerization of the desired products. In general, it is desirable to maintain the maximum feed preheat temperature in the preheating zone 13 below but within about 300° F. of the minimum desired reaction temperature and preferably about 100° F. therebelow. In the present example the gaseous products may enter the space 65 at about 2000° F. and pass upwardly through nozzles 18 into the column of solids in chamber 11. Due to the very high rate of heat exchange obtainable by direct contact of solids and gases with hot inert solid granules and with molten metal in this manner, the gaseous products are quickly quenched to a suitable temperature at which the desired product is stable. In the case of acetylene, the products should be quenched below about 700° F. In operations wherein ethylene is the desired product the quench temperature should be below about 700° F. and for a butadiene product the quench temperature should be below about 400° F. In the present example the gaseous products may be cooled to about 690° F. by the time they reach the outlet 48 from the upper section of chamber 11. The gaseous products then pass to a tower 49 where they are further quenched by means of water or oil introduced at 50. Condensed products are withdrawn from tower 49 at 51 and acetylene and other lower boiling products are withdrawn at 52. In many cases additional quenching is unnecessary and the gaseous products from chamber 11 may be passed directly to a suitable fractionator or absorption system.

The molten metal, lead, for example, which has been cooled by the reactant feed in chamber 13 is withdrawn at a temperature of about 800° F., for example, from sump 28 through conduit 55. It is pumped by pump 56 through conduit 57 to a suitable heat exchanger 58 wherein it is cooled to about 690° F. then the lead is passed via conduit 59 to header 70 feeding spray pipe 71 from which it is sprayed onto the surface 72 of the column of refractory packing material in chamber 11. The lead trickles down through the bed of packing and is heated by the gaseous reaction products in quench zone 11. Hot lead at about 1800° F. passes through tubes 16 onto the pool 24 in seal chamber 12 and then through tubes 21 and spray heads 25 onto the surface 73 of the column of granular refractory material in zone 13. The molten material leaving zone 11 and entering zone 13 may exist at about the desired reactant preheat temperature in this example about 2000° F. Instead of employing the external heat exchanger 58, heat transfer tubes may be positioned in sump 28. A suitable cooling fluid may be circulated through these tubes to adjust the temperature of the lead. The amount and temperature of the quench fluid introduced through conduit 43 into duct 42 may be so controlled by means of valve 73 and heat exchanger 74 so that the temperature of the molten metal passing to preheating zone 13 is substantially the desired reactant preheat temperature. In the preferred form of the invention the quench fluid introduced into duct 42 is the same molten metal employed in the quench and preheating chambers 11 and 13 respectively. The molten quench fluid passes out of duct 42 to the pool 24 in chamber 12 to mix with the remainder of the circulating fluid. In a less preferred form of the invention water or hydrocarbons or some other suitable quench fluid may be introduced into conduit 43 from conduit 75 in place of the molten metal. In this case the quench medium is vaporized and removed from the system along with the gaseous products.

Usually, however, I prefer to employ a molten metal as the quench fluid since this eliminates dilution of the reaction products and simplifies the product recovery system. It will be apparent that the molten metal employed in the system should be carefully selected with consideration of the particular operation and operating conditions involved. The metal may consist of a pure element or may consist of an alloy. Where final quench temperatures of the order of 700° F. are required lead or tin may be employed for example. Where the final quench temperature is higher, for example, of the order of 1000° F. examples of alloys which may be employed are 40% lead—60% antimony melting at about 915° F. 40% antimony—60% bismuth melting at about 968° F., and 60% lead—40% antimony at about 745° F. For lower quench temperatures the following alloys are examples 30% lead—70% tin melting at about 365° F., 40% lead—60% bismuth melting at about 260° F., 43% lead, 14% tin and 43% bismuth melting at about 262° F. If desired, certain mixtures of inorganic metal salts may be employed as the quench fluid. An example of such a mixture is one containing 43% by weight of lithium chloride, 52% potassium chloride and 5% sodium chloride. This mixture melts at about 606° F. In all cases care should be taken that the quench fluid selected boils substantially above the maximum temperature at which it will be employed and is substantially inert with respect to the reactants involved. It will be understood that in its broader aspects the invention is not limited to reactions occurring at temperatures as high as those involved in acetylene or ethylene production. In many high temperature hydrocarboncracking operations wherein gasoline or solvents are the desired products reaction temperatures of the order of 1000° F.–1500° F. may be involved. The lower melting point alloys are particularly suitable for preheating and quenching the reactants in this latter type of process.

It will be noted that by the method of this invention the process is to a large extent adiabatic, the heat picked up by the molten metal from the reaction products in quench zone 11 being supplied to the incoming reactant feed in preheating zone 13. In addition to the temperature control provided by the quench fluid introduced into duct 42, additional flexibility of temperature control is provided by the molten metal heat exchanger 58 wherein the metal may be heated or cooled as the operation requires. Also by control of the temperature of the reactant feed leaving furnace 45 the temperature of the lead passing to sump 28 may be adjusted. While for most operations it is important to limit the amount of reactant feed preheat to a temperature near but substantially below the desired reaction temperature in order to provide accurate control of reactant residence time at the reaction temperature, still in some operations this may be unnecessary in which case the reactant may leave zone 13 substantially at the desired reaction temperature. In this latter operation very little heat need be added to or withdrawn from the circulating molten metal, so that the by-pass 78 may be employed to by-pass heat exchanger 58 partially or entirely. Also the partial quench induct 42 may be eliminated in such operations.

By virtue of the fact that the gaseous reactants are converted in a separate reaction zone rather than in the preheating or quench zones the formation of carbonaceous deposits on the refractory packing is limited to a minimum and in many operations substantially entirely avoided. To further limit the amount of carbon deposited either in the zones 11 or 13 or in the reaction zone 38 itself steam may be added to the reactant feed through conduit 47. Periodically when some contaminant does deposit on the mass in zones 11 and 13, the molten metal may be drained from these zones and air may be introduced to zones 11 and 13 through conduits 80 and 81 respectively to burn off the deposits from the refractory material. The resulting flue gas may be withdrawn at 82 and 83. Any carbon or sediment picked up by the circulating molten metal during normal operation may be removed in strainers 84 and 85 placed in conduit 57 for that purpose.

The granular refractory packing material employed in zones 11 and 13 may take the form of a metal oxide, carbide or other material capable of withstanding the high temperatures involved without fusion or combination with the circulating molten metal. Calcium, magnesium and aluminum oxides, corundum and carborundum are examples. The solid material should consist of particles of irregular shape, pellets, spheres, saddles, etc. having an average diameter within the range about $\frac{1}{8}$ to $\frac{3}{4}$ inch diameter. The word "granular" as employed in claiming this invention is used in a broad sense as covering material of any of these shapes. Preferably granules having an average diameter of about 0.3 to 0.5 inch should be employed. It will be understood that while the use of packing in the preheating and squench zones in the manner described is the preferred form of this invention, it is contemplated that the invention in its broader aspects also covers the use of modified baffled preheating and quench zones wherein gas-molten metal contacting is effected in the absence of granular packing material.

From the above it will be apparent that the method and apparatus of this invention provide an economical and highly flexible and practical method for conducting high temperature reactions. The unstable gaseous products formed in furnace 38 are quickly and effectively quenched by direct contact with the molten metal heat transfer material in chamber 11. The heat recovered from the quenched products is then used entirely for preheating reactant products in chamber 13 thereby effecting a very substantial saving both in cooling load and in heating load. The principal objection to electrically heated reaction zones is thereby eliminated permitting the concentration of substantially all the electrical heating eenrgy for accomplishing the reaction and supplying the endothermic heat of reaction rather than for preheating purposes. This type of operation permits accurate control of the reactant residence time at the reaction temperatures. Moreover, by the use of electrical energy to supply the heat of endothermic reactions in a separate reaction zone located at a central point along the path gas-molten alloy contacting, i. e. between the preheating and quenching chamber, it becomes possible to introduce molten metal into chamber 11 at a relatively low temperature and to remove it from chamber 13 at about the same low temperature while still employing the molten metal at very high temperatures at intermediate points in chambers 11 and 13. This feature permits the use of conventional pump equipment for transferring the solid material between chambers even though the reactions involved require temperatures far above those at which pump equipment can be practically operated. By the use of electrical heating furnace 38 in this combined apparatus the above advantage has been attained without the dilution of reaction products by combustion gases and without the use of heat transfer tubes which permit only relatively low rates of heat transfer and which will not long withstand the temperatures involved.

It should be understood that the construction of the electrically heated reaction furnace 38 described hereinabove may be varied considerably from the form shown as will be readily understood by those skilled in the art. It is further contemplated that instead of supplying heat to the separate furnace 38 by means of electrical resistance heaters, the heat may be supplied by electrical induction. For example, the furnace 38 may be provided within with a large number of refractory baffles having a high heat capacity and a high electrical conductivity. Suitable induction coils may surround the baffles or the furnace and high frequency alternating currents may be passed through said coils so as to heat the refractory baffles by induction. Heat of reaction is transferred from the heated baffles to the reactant vapors passing around and contacting said heated baffles. Alternatively beds of particle-form inert, refractory solids having high electrical conductivity may be packed into the separate reaction zone and the bed may be heated by electrical conduction. The gaseous reactants from the preheating zone 13 pass through the heated refractory bed and undergo the desired conversion.

It will be understood that the particular conditions of operating temperature, pressure and reactant residence time at the conversion temperature will vary depending upon the particular reactants and reaction involved. As an example, in the conversion of methane to acetylene a residence time of about 0.0001–1.0 seconds within the temperature range 2300° F.–3000° F. and pressures of substantially atmospheric and lower is desirable. When the methane is diluted with hydrogen somewhat longer residence times up to 5–8 seconds are permissible. The amount of hydrogen added with the feed may vary from about 3 to 40 mols per mol of hydrocarbon introduced. Somewhat lower temperatures may be employed for the conversion of higher molecular weight hydrocarbons to acetylene. For example, temperatures of the order of 1800 to 2300° F. are suitable for conversion of ethane to acetylene. In another example, butadiene may be obtained by pyrolytic conversion of unsaturated $C_2$ and $C_3$ hydrocarbons at about 1450–1600° F. and about atmospheric pressure at residence times of the order of $\frac{1}{10}$ to 2 seconds. On the other hand naphtha cuts may be converted to butadiene containing products at temperatures of the order of 1300 to 1600° F. with a residence period of about .005–1 second. In the case of a butadiene containing product, the gaseous products should be quenched rapidly to a temperature below about 400° F. In another example, olefins may be prepared from butane or propane by pyrolytic conversion at approximately atmospheric pressure and 1250–1750° F. At about 1550° F. of the order .002 minute residence time is suitable.

It will be understood that the examples of apparatus construction and operation and of applications of this invention given hereinabove are intended as illustrative and should not be construed as limiting the scope of this invention except as it may be limited by the following claims.

I claim:

1. The method for conducting endothermic conversion of gaseous hydrocarbons at a suitable elevated conversion temperature range which comprises: passing the hydrocarbon gas serially through a preheating zone wherein it is rapidly heated to a temperature below but within about 100° F. to 300° F. of said suitable conversion temperature range, then without further preheating into and through a conversion zone wherein it is converted and the suitable conversion temperature range is maintained, and through a quenching zone wherein the gaseous conversion products are quickly cooled to a temperature substantially below said suitable conversion temperature range; heating said conversion zone electrically to maintain its temperature and to supply the endothermic heat of conversion; and utilizing the heat recovered from the quenching of said gaseous conversion products for preheating hydrocarbon feed by introducing a suitable molten metal heat exchange fluid into said quench zone at a temperature substantially below said suitable conversion temperature range, passing said heat exhange fluid through said quench zone countercurrently to and in direct contact with said gaseous products to quench said gaseous products while being heated thereby, passing the heated heat exchange fluid through said preheating zone countercurrently to and in direct contact with the gaseous hydrocarbon feed to preheat said gaseous feed while being cooled thereby, withdrawing cooled heat exchange fluid from said preheating zone and returning it to said quench zone.

2. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through a preheating zone to heat it to a temperature within about 300° F. but below the suitable reaction temperatures, passing the preheated reactant without further outside preheating through a confined reaction zone to effect conversion thereof at said suitable reaction temperatures, heating said reaction zone electrically to maintain its temperature and to supply the endothermic heat for the reaction, passing gaseous reaction products from said reaction zone into direct contact wtih a cooler molten metal heat exchange medium in a confined quench zone to quench said gaseous products to a temperature at which the products are substantially stable, withdrawing quenched gaseous products from said quench zone, passing a molten metal heat exchange medium through a plurality of zones in series the first of which is said quench zone wherein it moves countercurrently and in contact with said gaseous products to be heated to a temperature within about 300° F. of but below the suitable gaseous reactant conversion temperature, and the last of which is said preheating zone wherein it moves countercurrently to and in contact with the gaseous reactant charge to preheat said charge and to be cooled by the incoming gaseous reactant from a temperature within about 300° F. of said reaction temperatures to a temperature approximately the desired gaseous product quench temperature, withdrawing heat exchange medium from said preheating zone and passing it to said quench zone as the heat exchange medium supply thereto.

3. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through a preheating zone to heat it to a temperature within about 300° F. but below the suitable reaction temperature, passing the preheated reactant without further external preheating through a confined reaction zone to effect conversion thereof at said suitable reaction temperatures, heating said reaction zone electrically to maintain its temperature and to supply the endothermic heat for the reaction, mixing a suitable liquid quenching medium with the gaseous reaction products passing from said reaction zone to partially quench the products to a temperature but within about 300° F. thereof, passing the partially quenched gaseous products into direct contact with cooler molten metal heat exchange medium in a confined quench zone to quench said gaseous products to a temperature at which the products are substantially stable, withdrawing quenched gaseous products from said quench zone, passing a molten metal heat exchange medium through a plurality of zones in series the first of which is said quench zone wherein it moves in contact with and countercurrently to said gaseous products to be heated to a temperature within about 300° F. of but below the suitable gaseous reactant conversion temperature, and the last of which is said preheating zone wherein it moves in contact with and countercurrently to the gaseous reactant charge to preheat said charge and to be cooled by the incoming gaseous reactant from a temperature within about 300° F. of said reaction temperatures to a temperature approximating the desired gaseous product quench temperature, withdrawing molten metal heat exchange mediums from said preheating zone and passing it to said quench zone as the heat exchange medium supply thereto.

4. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through a preheating zone to heat it to a temperature within about 300° F. but below the suitable reaction temperature, passing the preheated reactant without further external preheating through a confined reaction zone to effect conversion thereof at said suitable reaction temperatures, heating said reaction zone electrically to maintain its temperature and to supply the endothermic heat for the reaction, passing gaseous reaction products from said reaction zone into contact with a relatively cooler molten metal heat exchange fluid in a confined quench zone to quench said gaseous products to a temperature at which the products are substantially stable, withdrawing quenched gaseous products from said quench zone, passing a molten metal heat exchange fluid through a plurality of zones in series the first of which is said quench zone wherein it moves in contact with and countercurrently to said gaseous products to be heated thereby, and the last of which is said preheating zone wherein it moves in contact with and countercurrently to the gaseous reactant charge to preheat said charge and to be cooled by the incoming gaseous reactant, withdrawing heat exchange fluid from said preheating zone and passing it to said quench zone as the heat exchange fluid supply thereto, and controlling the temperature of the heat exchange fluid leaving said quench zone and of the heat exchange fluid entering said preheating zone at a predetermined level below said reaction temperature by introduction of a spray of said molten metal heat exchange fluid into the gaseous reaction product stream passing from said reaction zone to said quench zone.

5. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through column of granular solids in a preheating zone to heat it to a temperature within about 300° F. but below the suitable reaction temperature, passing the preheated reactant directly from said preheating zone through a confined reaction zone to effect conversion thereof at said suitable reaction temperatures, heating said reaction zone electrically to maintain its temperature and to supply the endothermic heat for the reaction, passing gaseous reaction products from said reaction zone through a column of granular solids in a confined quench zone to quench said gaseous products to a temperature at which the products are substantially stable, withdrawing quenched gaseous products from said quench zone, passing a molten metal heat exchange fluid through a plurality of zones in series, the first of which is said quench zone wherein it moves through said column of solids countercurrently to said gaseous products to be heated to a temperature within about 300° F. of but below the suitable gaseous reactant conversion temperature, and the last of which is said preheating zone wherein it moves through said column of solids countercurrently to the gaseous reactant charge to preheat said charge and to be cooled by the incoming gaseous reactant, withdrawing the cooled metal heat exchange fluid from the preheating zone adjusting its temperature to approximately the desired gaseous reactant final quench temperature and passing the heat exchange fluid into said quench zone.

6. A continuous process for pyrolytic conversion of gaseous hydrocarbon reactants at elevated temperatures to gaseous hydrocarbon products which are unstable at the elevated conversion temperatures which comprises: maintaining a substantially compact column of inert granular refractory solids in a confined quench zone, maintaining a similar column in a confined preheating zone below said quench zone, passing a molten metal heat exchange fluid downwardly in series through said columns in said quench and preheating zones, introducing gaseous hydrocarbon reactant into the lower section of said preheating zone and passing it upwardly through said column therein to cool said heat exchange fluid and to preheat said reactant to a temperature below but within about 300° F. of the suitable range of conversion temperatures, passing the preheated gaseous reactant directly from said preheating zone through a separate confined reaction zone in contact with stationary electrical resistance elements, passing electric currents through said resistance elements to maintain the reaction temperature in said reaction zone and to supply the endothermic heat for the hydrocarbon conversion, subjecting the gaseous conversion products passing from said reaction zone to a spray of a suitable liquid quenching fluid to cool said products to a temperature below but within about 300° F. of said suitable range of conversion temperatures, passing the conversion products upwardly through said column in said quench zone to cool the gaseous products to a suitable quench temperature which is above the condensation temperature of said gaseous products and to heat said heat exchange fluid to a temperature within about 300° F. of said conversion temperature, withdrawing quenched gaseous products from said quench zone, withdrawing cooled heat exchange fluid from said preheating zone at a controlled rate while controlling its discharge temperature substantially equal to said suitable gaseous product quench temperature by adjustment of the inlet temperature of said gaseous reactant introduced into said preheating zone and returning the cooled heat exchange fluid to the upper section of said quench zone.

7. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through a preheating zone to heat it to a temperature within about 300° F. but below the suitable reaction temperatures, passing the preheated reactant without further external preheating through a confined reaction zone to effect conversion thereof at said suitable reaction temperatures, heating said reaction zone electrically to maintain its temperature and to supply the endothermic heat for the reaction, subjecting the gaseous reaction products to a preliminary cooling whereby they are cooled to a temperature below the reaction temperature but within about 300° F. thereof by contacting it in a preliminary quench zone with a stream of cooled molten metal, passing the partially cooled gaseous products through a substantially compact bed of refractive, particle form solid material in a confined quench zone countercurrently to and in contact with a substantially cooler molten metal heat exchange fluid to quench said gaseous products to a temperature at which the products are substantially stable, withdrawing quenched gaseous products from said quench zone, passing a molten metal heat exchange fluid through a plurality of zones in series the first of which is said quench zone wherein it moves downwardly through said compact bed countercurrently to said gaseous products to be heated to a temperature within about 300° F. of but below the suitable gaseous reactant conversion temperature, and the last of which is said preheating zone wherein it moves downwardly through a similar bed countercurrently to the gaseous reactant charge to preheat said charge and to be cooled by the incoming gaseous reactant from a temperature within about 300° F. of said reaction temperatures to a temperature approximating the desired gaseous product quench temperature, combining the molten metal from said preliminary quench zone with the heat exchange fluid entering said preheating zone, withdrawing the heat exchange fluid from said preheating zone and passing a portion of it to said quench zone as the contact material supply thereto and passing the remainder of it to said preliminary quench zone as the cooled molten metal supply thereto.

8. A continuous process for pyrolytic conversion of gaseous hydrocarbon reactants at elevated temperatures to gaseous hydrocarbon products which are unstable at the elevated conversion temperatures which comprises: passing a molten metal heat exchange fluid downwardly through a confined, granular, solid packed quench zone, a seal zone and a granular, solid packed preheating zone arranged in vertical series, introducing gaseous hydrocarbon reactant into the lower section of said preheating zone and passing it upwardly therethrough in contact with the countercurrently flowing heat exchange fluid to preheat said reactant to a temperature below but within about 300° F. of the suitable range of conversion temperatures, passing the preheated gaseous reactant from said preheating zone without additional external preheating through a separate confined reaction zone in contact with stationary electrical resistance elements, passing electric currents through said resistance elements to maintain the reaction temperature in said reaction zone and to supply the endothermic heat for the hydrocarbon conversion, subjecting the gaseous conversion products passing from said reaction zone to a spray of said molten metal fluid in a separate preliminary quench zone to cool said products to a temperature below but within about 300° F. of said suitable range of conversion temperature, passing the conversion products upwardly through said quench zone in contact with the countercurrently flowing heat exchange fluid to cool the gaseous products to a suitable quench temperature which is above the condensation temperature of said gaseous products and to heat said heat exchange fluid to a temperature within about 300° F. of said conversion temperature, withdrawing quenching gaseous products from said quench zone, maintaining a pool of said heat exchange fluid in said seal zone to provide a seal against direct gas flow between said preheating and quench zones, passing the molten metal fluid from said quench zone and from said preliminary quench zone into said pool and passing fluid from said pool to said preheating zone, withdrawing cooled heat exchange fluid from said preheating zone at a controlled rate and returning a portion of it to the upper section of said quench zone at approximately said suitable quench temperature for said gaseous products and spraying the remainder of said molten metal heat exchange fluid from said preheating zone into said separate preliminary quench zone.

9. The method for making acetylene from gaseous hydrocarbon reactants at suitable reaction temperatures within the range about 1800–3000° F. which comprises: passing the gaseous hydrocarbon reactant serially through a preheating zone wherein it is rapidly heated to a temperature within about 100° F. to 300° F. of but below said suitable conversion temperature range, then without further external preheating through a conversion zone wherein it is converted and the suitable conversion temperature range is maintained and through a quenching zone wherein the acetylene containing gaseous products are quickly cooled to below about 700° F., heating said conversion zone electrically to maintain a temperature within the range about 1800–3000° F. and to supply the endothermic heat for the reaction; and utilizing the heat recovered from the quenching of said gaseous conversion products for preheating hydrocarbon feed by introducing a suitable molten metal which is substantially inert to said reactants into said quench zone at a temperature below about 700° F., passing said molten metal through said quench zone countercurrently to said gaseous products to quench said gaseous products while being heated thereby, passing the heated molten metal through said preheating zone countercurrently to the gaseous hydrocarbon feed to preheat said gaseous feed while being cooled thereby, withdrawing cooled molten metal from said preheating zone and returning it to said quench zone, and introducing steam into said preheating zone at a controlled rate to mix with said reactants.

10. The process of claim 9 wherein the temperature of molten metal withdrawn from said preheating zone is controlled below about 700° F. and at a level suitable for introduction to said quench zone by control of the inlet temperature of gaseous reactant to said preheating zone.

11. A continuous process for pyrolytic conversion of gaseous hydrocarbon reactants at elevated temperatures to acetylene containing products which comprises: maintaining a bed of granular refractory material in a principal confined quench zone, maintaining a similar bed therebelow in a separate, confined preheating zone, passing a suitable molten metal heat exchange fluid downwardly through said bed of granular material in said confined quench zone and downwardly through said bed in said confined preheating zone in series, introducing gaseous hydrocarbon reactant and a controlled amount of a hydrogen containing gas into the lower section of said preheating zone at a temperature below about 700° F. and passing it upwardly through said bed therein to contact and to cool said heat exchange fluid and to preheat said reactant to a temperature below but within about 300° F. of the suitable range of conversion temperatures, passing the preheated gaseous reactant from said preheating zone without further external preheating through a separate confined reaction zone in contact with stationary electrical resistance elements, passing electric currents through said resistance elements to maintain the temperature therein within the range about 1800–3000° F. and to supply the endothermic heat for the hydrocarbon conversion, subjecting the gaseous conversion products passing from said reaction zone to intimate contact with cooler molten heat exchange fluid in a separate preliminary quench zone to cool said products to a temperature below but within about 300° F. of said suitable range of conversion temperature, passing the conversion products upwardly through said column of contact material in said quench zone to cool the gaseous products to a temperature below about 700° F., combining the heat exchange fluid from said preliminary quench zone with that flowing from said principal quench zone to said preheating zone, withdrawing cooled heat exchange fluid from said preheating zone at a controlled rate, passing at least a portion of said heat exchange fluid to said preliminary quench zones as the supply thereto, adjusting the temperature of the remainder of said heat exchange fluid below about 700° F. and introducing it into the upper section of said principal quench zone.

12. An apparatus for conversion of hydrocarbons at elevated temperatures which comprises in combination: a confined quench chamber having a liquid heat exchange fluid inlet near its upper end and a heat exchange fluid outlet near its lower end, said outlet being adapted to permit passage of liquid and to retain granular solid material within said chamber, gas inlet means to the lower section of said quench chamber and gas outlet means from the upper section of said chamber, a separate preheating chamber positioned below said quench chamber and having a liquid heat exchange fluid inlet and gas outlet means near its upper end and a liquid heat exchange fluid outlet and gas inlet means near its lower end, said liquid outlet being adapted to permit liquid passage and to retain granular solid material within said preheating chamber, passage defining means for flow of heat exchange fluid from the liquid fluid outlet from said quench chamber to the liquid fluid inlet to said preheating chamber, a heat exchange fluid sump below said preheating chamber, means to conduct liquid heat exchange fluid from said liquid fluid outlet from said preheating chamber to said sump, means to transfer liquid heat exchange fluid from said sump to said liquid fluid inlet to said quench chamber, a separate reaction chamber, means to heat said reaction chamber electrically, means to supply gaseous reactant to said gas inlet to said preheating chamber, means to pass gaseous reactant from said gas outlet from said preheating chamber to said reaction chamber, passage defining means for flow of gaseous products from said reaction chamber to said gas inlet to said quench chamber, means to introduce a quench liquid into said passage defining means at a controlled rate and means to withdraw quenched gaseous products from said gas outlet in said quench chamber.

13. An apparatus for conversion of gaseous hydrocarbons at elevated temperatures which comprises in combination: a substantially vertical gas tight vessel, a liquid heat exchange fluid inlet means at its upper end, liquid outlet means at its lower end, partitioning within said vessel dividing it into an upper quench chamber, a lower preheating chamber, and an intermediate seal chamber, said partitioning being impervious to granular material passage therethrough, conduit means associated with said partitioning to provide liquid flow passages from the bottom of said quench chamber to a level in the lower portion of said seal chamber, a plurality of conduits for liquid flow extending from the lower portion of said seal chamber into said preheating chamber, an inverted cup of larger diameter than said conduits positioned above the open upper end of each of said conduits and having its sides extending below the upper ends of said conduits, means to return liquid heat exchange fluid from said outlet on the bottom of said vessel to said liquid inlet at its upper end, a separate heat insulated reaction chamber, a plurality of stationary highly conductive electrical resistance elements spaced apart within said reaction chamber, means to pass electrical currents through said elements to heat said reaction chamber, means to introduce gaseous reactants into the lower section of said preheating chamber, means to separately pass preheated gaseous reactants from the upper section of said preheating chamber to said reaction chamber, passage defining means for flow of gaseous products from said reaction chamber into said seal chamber, conduits for gas flow extending from said seal chamber, into the lower section of said quench chamber, a liquid spray device adapted for spraying liquid into said passage defining means, and means to supply quench liquid to said spray device, and means to withdraw quenched gaseous products from the upper section of said quench chamber.

14. An apparatus for conversion of hydrocarbons at elevated temperatures which comprises in combination: a confined granular material retaining reactant quench chamber, a bed of granular refractory material within said chamber, gas inlet means within the lower section of said chamber and gas outlet means within the upper section thereof, a spray device for liquid heat exchange fluid within the upper section of said quench chamber, outlet means for liquid heat exchange fluid near the lower end of said chamber, means associated with said outlet to prevent escape of granular solids therethrough, a separate reactant preheating chamber positioned below said quench chamber, a bed of granular refractory material within said preheating chamber, passage defining means for passage of liquid heat exchange fluid from the outlet therefore on said quench chamber into the upper section of said preheating chamber, an outlet for liquid heat exchange fluid near the lower end of said preheating chamber, means associated with said outlet to prevent escape of granular solids therethrough, a sump chamber for liquid heat exchange fluid, passage defining means for flow of liquid heat exchange fluid from said outlet therefore on said preheating chamber into said sump chamber, heat transfer means to adjust the temperature of said heat exchange fluid and means to deliver a portion of said fluid to said spray device in said quench chamber, a separate reaction chamber, means to heat said reaction chamber, means to supply gaseous reactant into the lower section of said preheating chamber, means to pass gaseous reactant from the upper section of said preheating chamber to said reaction chamber, means to exclude direct flow of gaseous reactant between said quench chamber and said preheating chamber, and passage defining means for flow of gaseous products from said reaction chamber to said gas inlet to said quench chamber, means to introduce a portion of said heat exchange fluid from said sump chamber into said last named passage defining means to contact said gaseous products.

15. An apparatus for conversion of hydrocarbons at elevated temperatures which comprises in combination: a substantially vertical gas tight heat insulated vessel, partitioning within said vessel defining an upper quench chamber and a lower preheating chamber and an intermediate seal chamber, the partitioning defining the bottoms of the quench and preheating chambers being adapted to support and retain granular material within said chambers, a bed of granular refractory material in each of said quench and preheating chambers, conduits associated with said partitioning adapted to provide passages for liquid heat exchange fluid flow from the bottom of said quench chamber into said seal chamber and from the bottom of said seal chamber into said preheating chamber, means associated with said conduits to prevent granular material escape therethrough from said quench chamber, a separate heat insulated reaction chamber, a plurality of stationary highly conductive electrical resistance elements spaced apart within said reaction chamber, means to pass electrical currents through said elements to heat said reaction chamber, means to introduce gaseous reactants into the lower section of said preheating chamber, means to separately pass preheated gaseous reactants from the upper section of said preheating chamber to said reaction chamber, passage defining means for flow of gaseous products from said reaction chamber into said seal chamber, passage defining means for flow of gaseous products from the upper section of said seal chamber into the lower section of said quench chamber, a liquid spray device adapted for spraying liquid into said passage defining means, and means to withdraw quenched gaseous products from the upper section of said quench chamber, means to withdraw liquid heat exchange fluid from the lower section of said vessel, a heat exchanger adapted to adjust the temperature of the withdrawn heat exchange fluid, means to pass said withdrawn heat exchange fluid through said heat exchanger, means to pass a portion of the heat exchange fluid from said heat exchanger into the upper section of said vessel, and means to deliver a portion of said heat exchange fluid from said heat exchanger to said spray device.

16. An apparatus for conversion of hydrocarbons at elevated temperatures which comprises in combination: a substantially vertical gas tight, heat insulated vessel, two vertically spaced horizontal partitions extending across said vessel at intermediate levels along its length defining an upper quench chamber and an intermediate seal chamber, passages for liquid and gas flow through the uppermost of said two partitions, at least one conduit extending from a level within said seal chamber intermediate said partitions downwardly through the lowermost of said partitions for flow of liquid to the portion of said vessel therebelow, an inverted cup surrounding the upper end of said conduit to prevent direct flow of liquid thereinto but adapted to provide a passage for liquid flow to the upper end of said conduit from the lower edge of said cup, a third horizontal partition extending across the lower section of said vessel to define the bottom of a preheating chamber below said seal chamber and the top of a sump chamber for liquid heat exchange fluid below said preheating chamber, passages through said third partition for flow of liquid heat exchange fluid into said sump chamber, a bed of granular refractory material extending throughout a major portion of said quench chamber and a similar bed within said preheating chamber, outlet conduit means on the bottom of said vessel for withdrawal of heat exchange fluid from said sump, liquid heat exchange fluid inlet means in the upper section of said quench chamber, means to deliver a portion of the liquid from said sump outlet conduit to said liquid inlet means to said quench chamber, a separate reaction chamber, means to heat said reaction chamber electrically, means to introduce gaseous reactant feed into the lower section of said preheating chamber, passage defining means for flow of preheated gaseous reactants from the upper section of said preheating chamber to said reaction chamber, passage defining means for flow of gaseous reaction products from said reaction chamber to said seal chamber, a spray device within said passage defining means, a heat exchanger adapted to cool liquid heat exchange fluid, means to pass a portion of the liquid heat exchange fluid from said sump outlet conduit through said heat exchanger and means to deliver the heat exchange fluid from said heat exchanger to said spray device.

17. A continuous process for pyrolytic conversion of substantially saturated gaseous hydrocarbons at elevated temperatures to ethylene containing products which comprises: passing gaseous saturated hydrocarbon reactant through a preheating zone to heat it to a temperature below but within about 300° F. of the suitable conversion temperature, passing the preheated reactant through a confined reaction zone to effect conversion thereof to ethylene containing gaseous products, heating said reaction zone electrically to maintain it at a suitable reaction temperature within the range about 1300–1750° F. and to supply the endothermic heat for the reaction, passing gaseous reaction products from said reaction zone into contact with a molten metal heat exchange fluid existing at a lower temperature in a confined quench zone to quench said gaseous products to a temperature below about 700° F., withdrawing quenched gaseous products from said quench zone, passing a molten metal heat exchange fluid which is substantially inert to hydrocarbons through a plurality of zones in series, the first of which is said quench zone wherein it moves countercurrently to said gaseous products to be heated to a temperature within about 300° F. but below the suitable gaseous reactant conversion temperature, and the last of which is said preheating zone wherein it moves countercurrently to the gaseous reactant charge to preheat said charge and to be cooled by the incoming gaseous reactant from a temperature within about 300° F. of said reaction temperature to a temperature approximating the desired gaseous product quench temperature, withdrawing heat exchange fluid from said preheating zone and passing it to said quench zone as the supply thereto.

18. A continuous process for pyrolytic conversion of gaseous hydrocarbons having more than one carbon atom per molecule at elevated temperatures to butadiene containing products which comprises: passing the gaseous reactant feed through a preheating zone to heat it to a temperature below but within about 300° F. of the suitable conversion temperature, passing the preheated reactant through a confined reaction zone to effect conversion thereof to butadiene containing gaseous products, heating said reaction zone electrically to maintain it at a suitable reaction temperature within the range about 1300–1600° F. and to supply the endothermic heat for the reaction, passing gaseous reaction products from said reaction zone into contact with a moving molten metal existing at a lower temperature in a confined quench zone to quench said gaseous product to a temperature below about 400° F., withdrawing quenched gaseous products from said quench zone, passing suitable molten metal which is inert to hydrocarbons at the temperatures involved through a plurality of zones in series, the first of which is said quench zone wherein it moves countercurrently to said gaseous products to be heated to a temperature within about 300° F. of but below the suitable gaseous reactant conversion temperature, and the last of which is said preheating zone wherein it moves countercurrently to the gaseous reactant charge to preheat said charge and to be cooled by the incoming gaseous reactant from a temperature within about 300° F. of said reaction temperatures to a temperature approximating the desired gaseous product quench temperature, withdrawing molten metal from said preheating zone and passing it to said quench zone as the supply thereto.

LOUIS P. EVANS.

REFERENCES CITED

The following references are of record in the file of this patent:

UNITED STATES PATENTS

| Number | Name | Date |
|---|---|---|
| 1,282,906 | Mersereau | Oct. 29, 1918 |
| 1,681,926 | Bell | Aug. 28, 1928 |
| 1,880,309 | Wulff | Oct. 4, 1932 |
| 1,898,301 | Herman et al. | Feb. 21, 1933 |
| 1,905,185 | Morris | Apr. 25, 1933 |
| 2,167,471 | Auerbach | July 25, 1939 |
| 2,197,257 | Burk | Apr. 16, 1940 |
| 2,354,353 | Abrams | July 25, 1944 |
| 2,439,730 | Happel | Apr. 13, 1948 |
| 2,443,210 | Upham | June 15, 1948 |

FOREIGN PATENTS

| Number | Country | Date |
|---|---|---|
| 60,147 | Norway | Nov. 21, 1938 |
| 525,197 | Great Britain | Aug. 23, 1940 |

Certificate of Correction

Patent No. 2,543,743 February 27, 1951

LOUIS P. EVANS

It is hereby certified that error appears in the above numbered patent requiring correction as follows:

In the grant, line 1, address of inventor, for "Woodbury, Massachusetts" read *Woodbury, New Jersey*; in the heading to the printed specification, line 5, for "Woodbury, Mass." read *Woodbury, N. J.*; in the printed specification, column 6, line 43, after "antimony" insert *melting*; column 7, line 59, for "squench" read *quench*; column 8, line 6, for "eenrgy" read *energy*; column 10, line 46, after "temperature" insert *below the reaction temperature*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*